(12) United States Patent
Morris et al.

(10) Patent No.: US 6,813,692 B2
(45) Date of Patent: Nov. 2, 2004

(54) RECEIVER APPARATUS AND METHOD

(75) Inventors: Steven Morris, Taipei (TW); Octavius J. Morris, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 183 days.

(21) Appl. No.: 10/186,646

(22) Filed: Jul. 1, 2002

(65) Prior Publication Data

US 2003/0009630 A1 Jan. 9, 2003

(51) Int. Cl.[7] .............................................. G06F 12/08
(52) U.S. Cl. ........................................ 711/133; 711/134
(58) Field of Search ............................... 711/133, 134, 711/118, 159

(56) References Cited

U.S. PATENT DOCUMENTS

| | | | | |
|---|---|---|---|---|
| 5,043,885 A | * | 8/1991 | Robinson | 711/133 |
| 5,701,432 A | * | 12/1997 | Wong et al. | 711/130 |
| 5,764,992 A | | 6/1998 | Kullick et al. | 395/712 |
| 5,920,725 A | * | 7/1999 | Ma et al. | 717/171 |
| 6,292,194 B1 | * | 9/2001 | Powell, III | 345/582 |
| 2002/0107995 A1 | * | 8/2002 | Skaringer et al. | 709/315 |
| 2003/0002432 A1 | * | 1/2003 | Morris et al. | 370/200 |

FOREIGN PATENT DOCUMENTS

EP  0909091 A1  4/1999  ............ H04N/7/00

* cited by examiner

*Primary Examiner*—Hiep T. Nguyen

(57) ABSTRACT

In a DSM-CC receiver (12), a signal comprising a periodically repeated plurality of data sections is received. Storage means (14) are provided for catching the data sections included in the signal (13) where the act of accessing a data section results in a reference being created, this reference being removed when no longer being accessed. A reference count is kept for each data section such that a data section is marked for deletion if its reference count falls to zero. There is a further aspect where the storage means (14) are defragmented by noting the data sections that are being referenced and then, in any order, compacting these referenced data sections by relocating them together in one part of the storage means (14) and updating the values of pointers that referred to the moved cells.

23 Claims, 6 Drawing Sheets

RECEIVER APPARATUS AND METHOD

The present invention relates to communications systems and, in particular, those employing multiplex signals comprising a periodically repeated plurality of modules.

Interactive digital television applications such as tele-banking, tele-shopping or electronic newspapers are typically broadcast in a carousel like fashion where the corresponding data sections are repeated periodically in the transport stream.

DSM-CC (Digital Storage Media-Command and Control) object carousels are such a type of broadcast file system used in interactive digital TV. These have been specified as the delivery system for content in several standards, including the UK Digital Terrestrial Group guidelines and the DVB Multimedia Home Platform (MHP). A DSM-CC object carousel consists of a number of 'modules', each of which contains part of a larger directory structure, either as several small files (in which case the maximum module size is 64 Kbytes) or a single large file (where the module can be any size). These modules are then broadcast with the digital TV signal, with some modules possibly being repeated to improve access times. Once all modules have been broadcast, the broadcaster returns to the beginning and starts broadcasting the modules again. This process bears a close resemblance to the way that teletext pages are broadcast, with DSM-CC modules replacing individual teletext pages as the basic unit.

Digital TV platforms that use DSM-CC typically cache at least some DSM-CC modules, to avoid the long delays in accessing modules encountered with systems like teletext which are caused by having to wait for the requested module's turn to be broadcast. This cache may be quite small and therefore effective management of the cache is important. On a DVB MHP platform, another level of complexity to the cache management is added since an application broadcast using DSM-CC can access the object carousel and load files from it.

The DSM-CC cache actually acts like a small part of memory, independent of all others. Objects are created in that memory (DSM-CC modules that have been loaded in this case) and must be freed at some later point when they are no longer needed. The platform must decide when a module can be freed to avoid long delays in re-loading a module if it is still being used.

Another perennial problem when managing memory is the problem of fragmentation. As objects get created and destroyed in a memory space, the available free space gets fragmented, with still-active pieces of memory existing between areas of free space. This can make it impossible to allocate large blocks of memory, and can be a significant problem given the potential size of DSM-CC modules.

The invention provides methods and apparatuses for management of DSM-CC and similar caches as defined in the appended claims to which reference should now be made and the disclosure of which is included herein by reference.

By thinking of the cache as a small, independent part of memory, it becomes possible to apply existing garbage collection algorithms to managing the cache and addressing the above problems. Garbage collection is a method for managing memory in some computer systems and programming languages (Java in particular) where the user does not have to explicitly free memory after use. Instead, the system will detect that the memory is not being used and automatically free it. There are a number of different methods of garbage collection, of which some are more applicable to certain machines and applications than others.

Due to the characteristics of the DSM-CC cache, in particular the fact that the only references to a module will be from outside the DSM-CC cache, a highly efficient reference count implementation of garbage collection can be used to manage the cache. This implementation involves keeping track of the number of references that exist to an object in the memory space that is handled by the garbage collector. The object can safely be reclaimed if the number of references is zero. Pure reference count algorithms cannot usually be used in garbage collection, because any data structure that refers to itself (either directly or indirectly) will always have a reference count of at least one, and will therefore never get reclaimed. This type of structure will never occur in a DSM-CC cache, however, since a module will never have a reference to another module and all references to a module will be from outside the cache.

Another type of garbage collector, which may use reference counting as one part of the algorithm, is a compacting garbage collector, where instead of a direct reference to an object in the cache, the application has a reference to a 'handle' that provides a level of indirection. This then allows the garbage collector to move the data in memory, in order to gather all the free space into one block, thus allowing more objects to be created than may otherwise be possible. This makes it particularly suitable for addressing the problem of fragmentation.

Embodiments of the invention will now be described, by way of example only, with reference to the accompanying drawings, in which.

Figure 1:
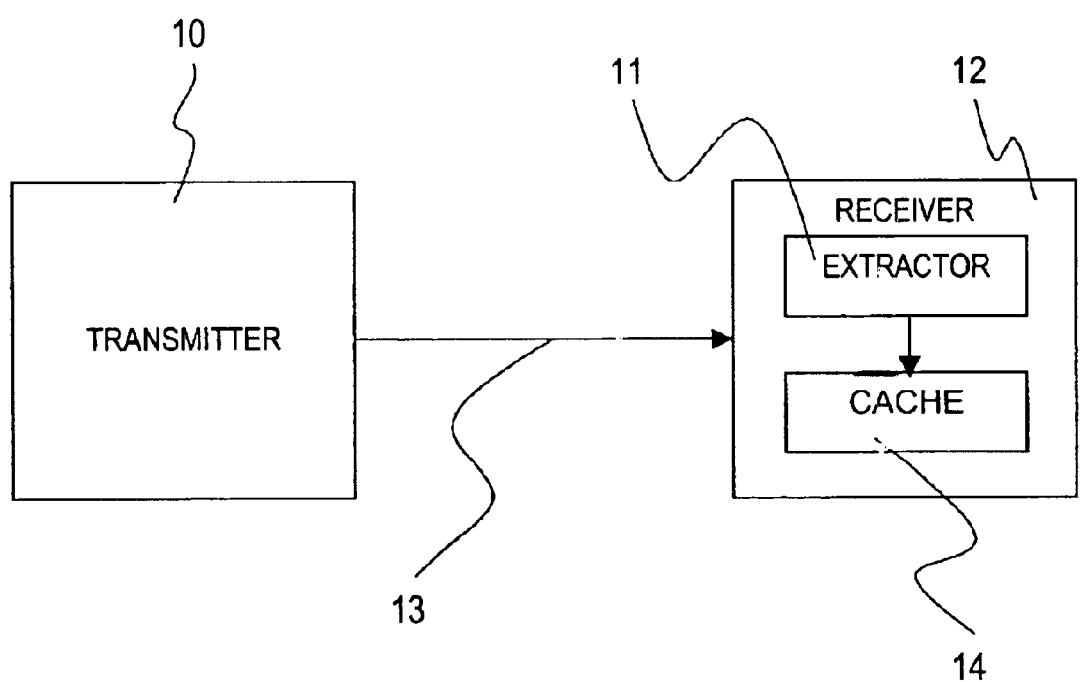
FIG. 1 is a generalised block diagram of apparatus embodying the invention.

Referring to the block diagram of FIG. 1 there is provided a transmitter 10 for transmitting a signal 13, such as a digital television signal. This signal comprises of a number of modules that are repeated periodically. A receiver 12, such as the type commonly referred to as a "set top box", receives said signal. The receiver 12 consists of means for extracting files 11 and modules from the signal and a cache memory 14. The cache memory 14 is used to store certain modules where necessary, such that they can be accessed quickly. The extractor 11 includes file management means for adding and deleting files from the cache memory in an orderly fashion.

FIG. 2 shows a set top box at four different stages of operation. The set top box comprises a processing unit 20 for processing modules and a cache memory 21, large enough to store 6 modules. In the case of a DSM-CC cache, references are created by the act of opening a file (which will map on to one or more DSM-CC modules), and removed by closing the file. For this reason the reference count may be tracked easily by incrementing the reference count for a file when the file is opened and decrementing it when the file is closed. When the reference count is zero, the module can be marked as available to be deleted. This module will then be deleted by the garbage collector at an appropriate time. In the meantime, the module will still be available from the cache, should another request to open a file from that module be generated.

Figure 2A:
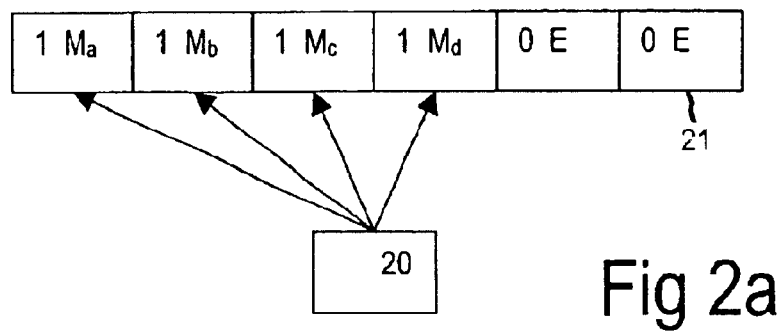
FIGS. 2a to 2e are block diagrams depicting an example of one embodiment of the invention in five stages of operation.

FIG. 2a has the first 4 cells of cache 21 filled with 4 modules $M_a$, $M_b$, $M_c$, $M_d$. Each of these modules $M_a$, $M_b$, $M_c$, $M_d$ is being referenced by the processing unit 20, hence their reference count of 1. The final 2 cells of cache are empty, signified as E.

Figure 2B:
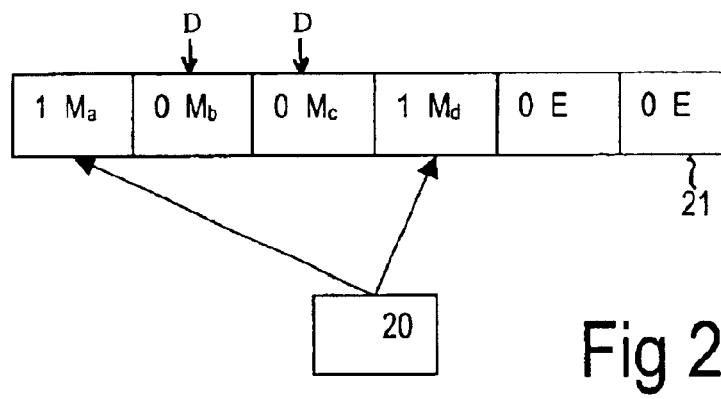

In the example of FIG. 2b, the processing unit 20 has stopped referencing the second and third modules $M_b$, $M_c$ in the cache 21. This means that the reference count for the corresponding cell of memory has fallen to zero. Consequently, these files are marked for deletion D and will be deleted by the garbage collector at an appropriate time. This may happen immediately, or may happen at some later stage of the garbage collection cycle. In the case that they are not deleted immediately, they will be available should a request for a file from one of those modules be issued.

Figure 2C:
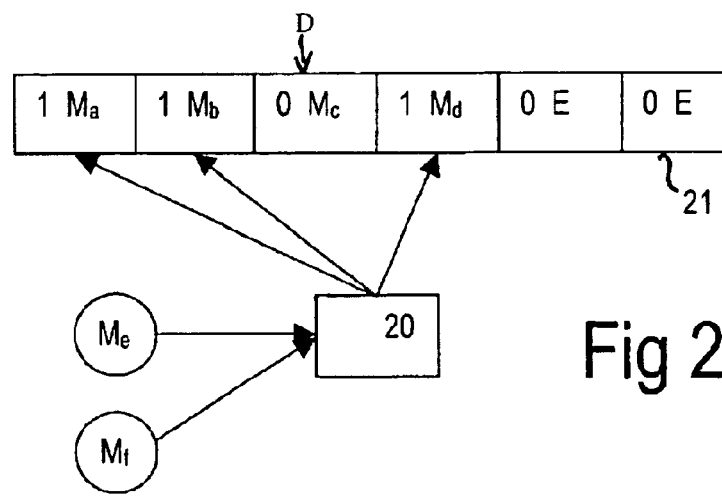

At FIG. 2c a further reference is made to the module $M_b$ in the second cell of cache. Accordingly, the reference count for this cache cell is incremented and this module M is no longer marked for deletion. Two new modules $M^e$ and $M^f$ have been fetched and will be stored in the next available cells of cache, that is the fifth and sixth cells. At this point the cache 21 is full.

Figure 2D:
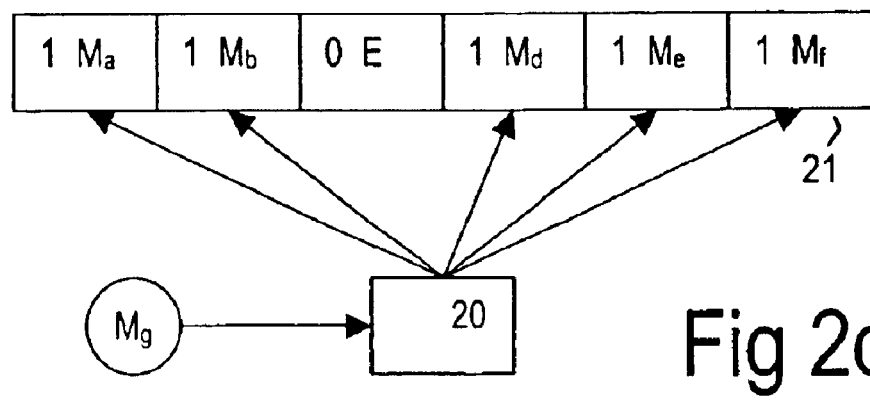
Figure 2E:
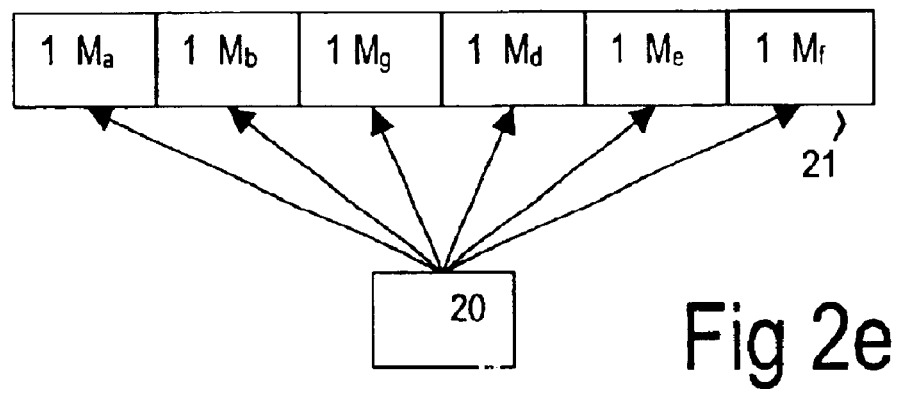

In FIG. 2d another new module $M_g$ is to be cached. As the cache 21 is presently full, the system looks for any files marked for deletion D. In this case the third cell is marked as such, due to its reference count of zero, and therefore the module $M_c$ located within is deleted. This frees up the required space and therefore the new module $M_g$ can be saved here, as can be seen in FIG. 2e.

One peculiarity of DSM-CC is that the contents of a file may be dynamically updated and inserted into the carousel. Each module has a version number associated with it, which the DSM-CC cache can use to check whether the module has changed. In the case that the cache detects an updated version of a module containing a file that is currently open, the cache cannot simply replace the old module. This would cause too many potential problems of data integrity. However, it is in the interests of efficient cache management to free the old version of the module as soon as possible.

In the case where a later version of a module exists in the cache when the reference count reaches zero, the module will immediately be deleted from the cache so that any requests for a file from that module will be returned a reference to the file from the latest version of the module. This ensures that old versions of a module do not use space in the cache that could be used more efficiently and also ensures that only the latest version is accessible to any new requests from an application. This is shown in FIGS. 3a–3e.

Figure 3A:
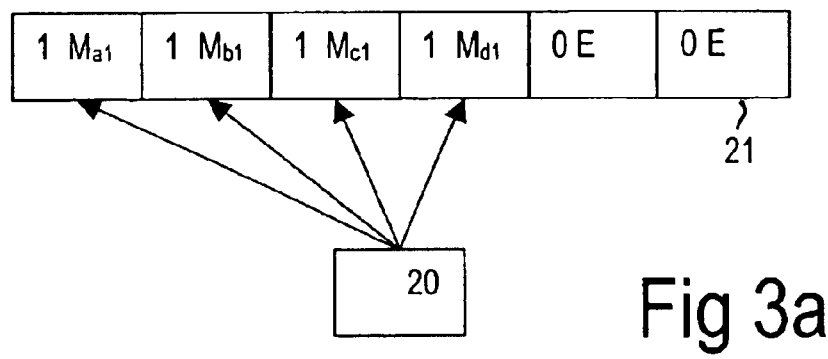
FIGS. 3a to 3e are block diagrams depicting an example of further embodiment of the invention in five stages of operation.

FIG. 3a shows the same cache 21 and set top box 20 as FIG. 2. This time the first four cells are filled with modules $M_{a1}$, $M_{b1}$, $M_{c1}$, $M_{d1}$, each module being referenced. The subscript 1 signifies that these are a first version of each module in the cache. The last two cells are empty.

Figure 3B:
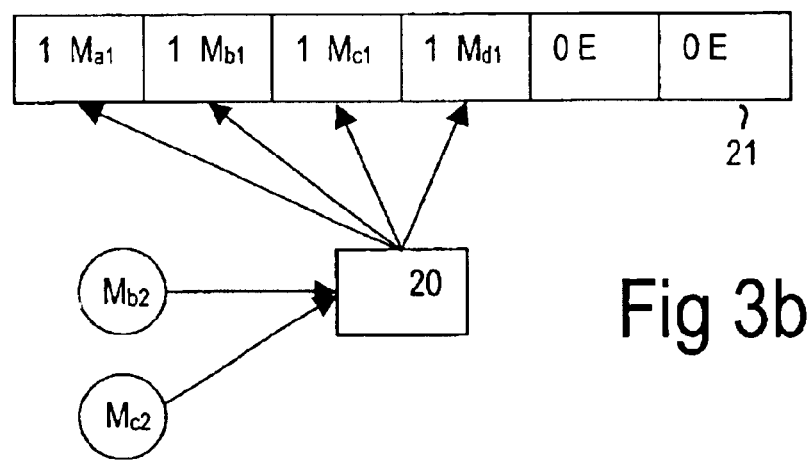
Figure 3C:
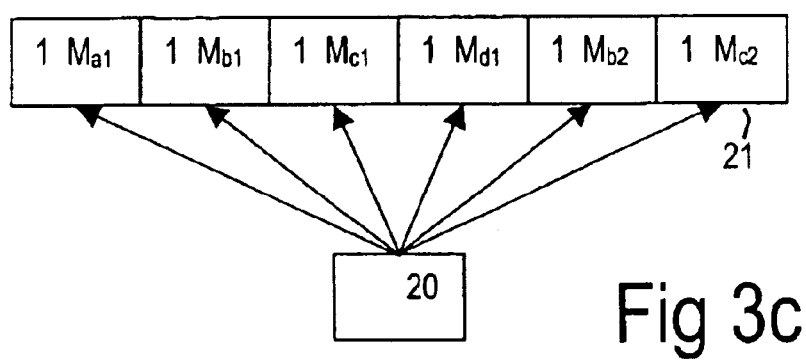
Figure 3D:
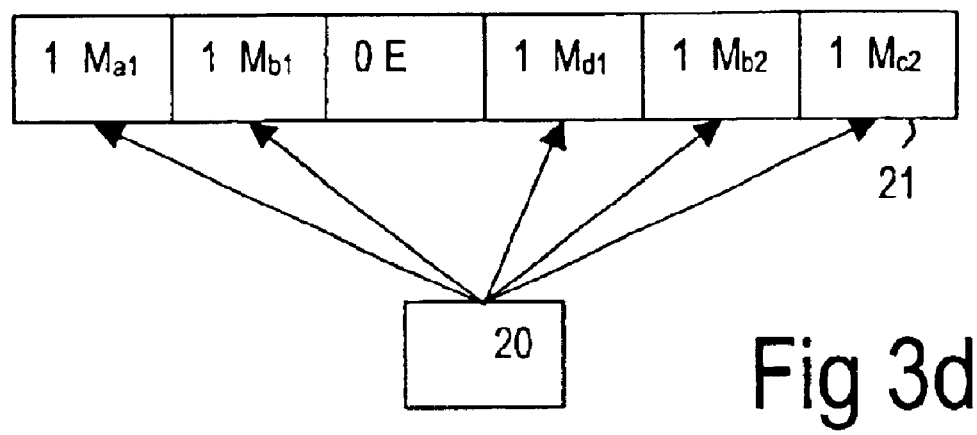
Figure 3E:
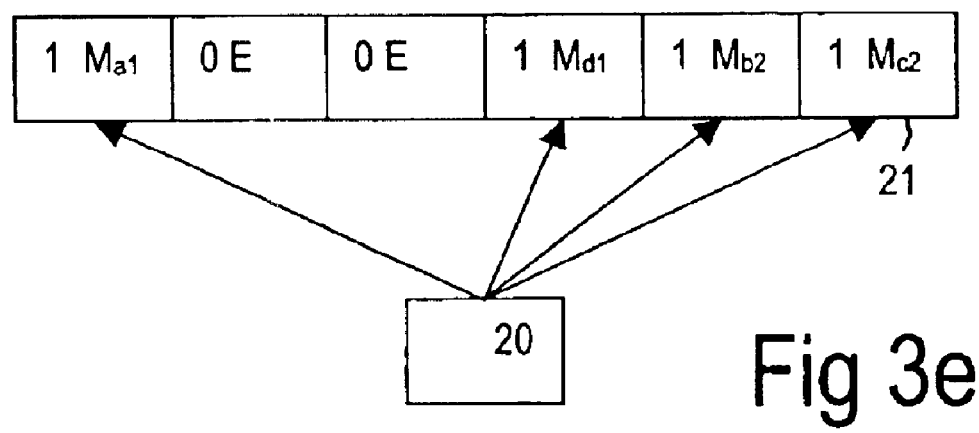

At FIG. 3b later versions of modules $M_b$ and $M_c$ are fetched ($M_{b2}$, $M_{c2}$). However the earlier versions $M_{c1}$, $M_{c1}$, are still being referenced and thus cannot be deleted. These later versions $M_{b2}$, $M_{c2}$ are thus stored in the two empty cache cells as shown in FIG. 3c At FIG. 3d module $M_{c1}$ is no longer being referenced, thus its reference count falls to zero. Unlike the case for latest versions of modules stored in the cache, where the modules are marked for deletion when no longer referenced, to be deleted when necessary, an earlier version of a module is deleted immediately if there is a later version in cache 21. Thus any subsequent references to $M_c$ will be directed to the latest version $M_{c2}$. In FIG. 3e, module $M_b$, is no longer being referenced and thus is also immediately deleted.

The method described above is efficient at clearing redundant files from the cache, and therefore managing the cache more efficiently. However, this method also tends to fragment the cache, therefore potentially rendering it impossible to cache a large module, due to there being no hole (consecutive free blocks of cache) large enough, even though there is enough total free space to do so.

FIG. 4 depicts a suitable garbage collection method which compacts the cache and addresses the fragmentation problem. The main difference in this method is that every module has its own handle. The handle typically has a pointer to the address in the heap where the module resides and also the reference count of that module. Any references to a module are made via this handle, and therefore when the position of an object in the heap is changed, only the handle need be changed accordingly. All other references to a module are unaffected as these refer to the corresponding handle.

Figure 4A:
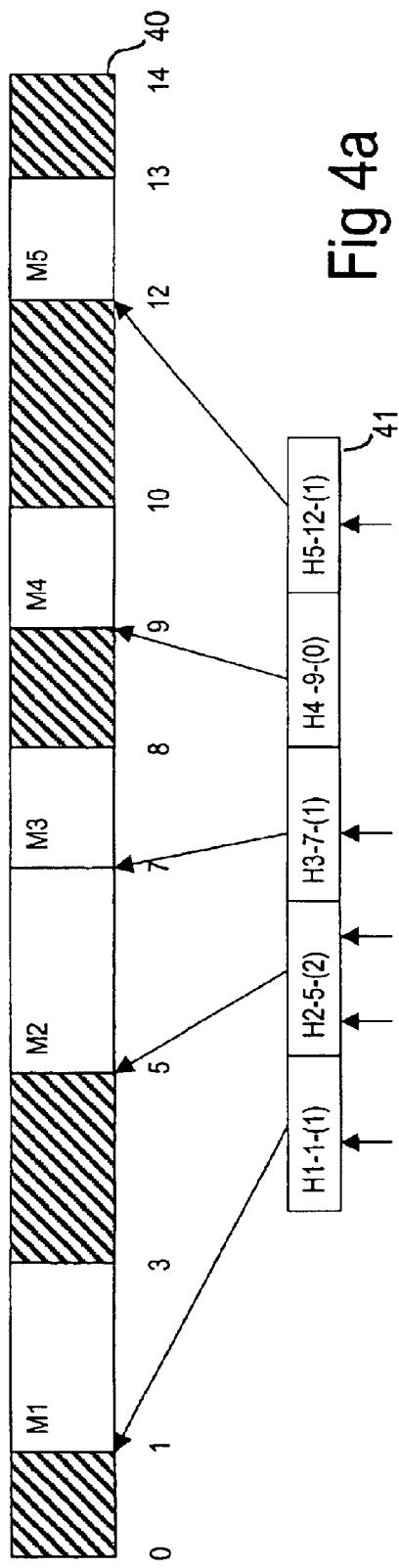
FIGS. 4a and 4b are block diagrams depicting an example of a yet further embodiment of the invention in two stages of operation.

Referring to FIG. 4a, there is a 14 cell cache memory 40 in which 5 modules of differing sizes are currently stored M1–M5. There is also a handle table 41 which contain the handles of each module H1–H5, H1 corresponding to M1, H2 to M2, etc. The second number in each handle is the pointer address, (each pointer is also shown as an arrow to the cache 40) and the final number, in parenthesis, is it's reference count (each reference shown as an arrow to the handle).

In this example the cache 40 has become fragmented due to the deletion of modules, to the point that a module the size of 3 cells cannot be accommodated, despite there being a total of 7 cells free and one cell containing a redundant module M4.

The method first works by doing a sweep of the handle table 41 from the very beginning and working up. This sweep stage checks the reference count of each handle. Any handle with a count of zero is removed from the table. This is continued until the end of the table 41 is reached.

A compacting stage is then begun. Firstly, any modules without a handle are deleted. Then for every handle, each corresponding module is moved to the lowest free area in the cache. The handle data is then updated to reflect this new location, this is again done until the end of the handle table 41 is reached.

Figure 4B:
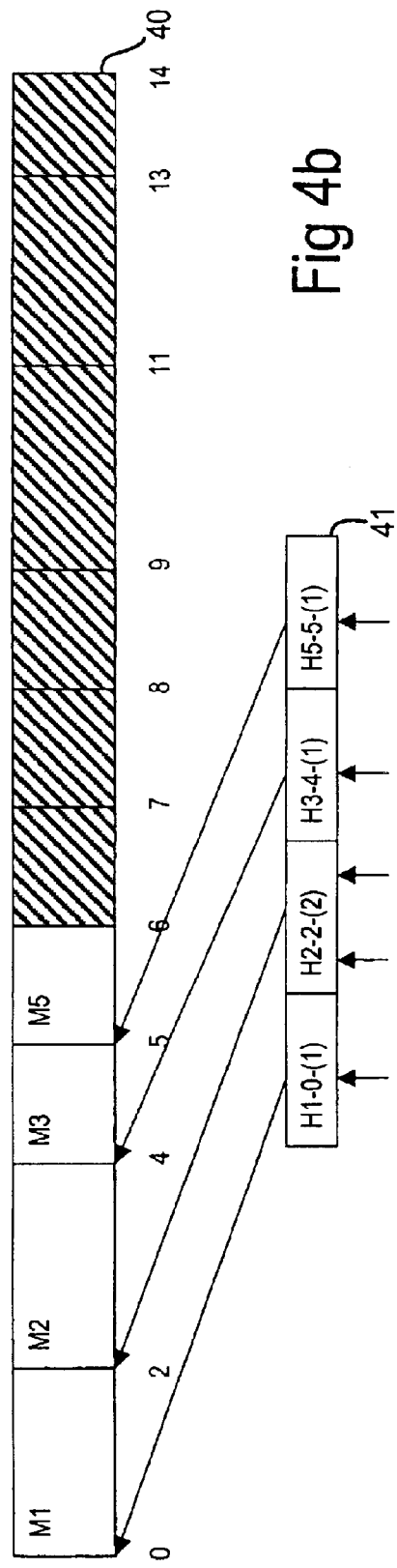

FIG. 4b shows the situation after this compacting has been done. As the handle H4 was not referenced, it was deleted along with its associated module M4, the rest of the modules were then relocated to the lowest free space, that is 0 for M1, 2 for M2, 4 for M3 and 5 for M5. The pointers in the handles have been updated accordingly. It should now be apparent that a module the size of 3 cells (or even twice this size) could be comfortably accommodated.

It should be noted that other compacting garbage collection methods known in the art will also be suitable for carrying out the method so long as they carry out the following steps (the order of the final two can be reversed):

check the reference count and note the active data structure;

compact the data structure by relocating cells;

update the values of the pointers that referred to the moved cells.

Other suitable methods include Two-Finger algorithms, Forwarding address algorithms and Table based methods. Details of these can be found in chapter 5 of "Garbage Collection" by Jones and Lins, ISBN 0 471 94148 4.

What is claimed is:

1. A method of cache management in a receiver, for receiving a signal comprising modules having a periodically repeated plurality of data sections, said receiver including cache storage for caching certain modules having data sections included in the signal wherein accessing a data section results in a corresponding reference being created, said references being removed when no longer being accessed, and wherein if a data section has no references attributed to it, said un-referenced data section is marked for deletion.

2. A method as claimed in claim 1 wherein a reference count is kept for each data section, said reference count being incremented each time a reference is created and decremented each time a reference is removed, such that a data section with a reference count of zero is marked for deletion.

3. A method as claimed in claim 1 wherein said data sections marked for deletion are deleted when the space is required, and are able to be re-accessed until they are deleted.

4. A method as claimed in claim 1 wherein each data section is being received under a corresponding file name, and wherein the received file names are modified within the receiver to distinguish between previous or subsequent versions of the same data sections of the signal that are stored in said storage means.

5. A method as claimed in claim 4 wherein, where there is a later version of a data section stored in the cache storage, previous versions of the same data section are immediately deleted, when no longer being referenced.

6. A method as claimed in claim 1 wherein the cache storage is defragmented by noting the data sections that are being referenced and then, in any order, compacting these referenced data sections by relocating them together in one part of the storage means and updating the values of pointers that referred to the moved cells.

7. A method as claimed in claim 6 wherein each data section has a corresponding handle attributed to it, where all references to a data section are made via said handle, and wherein the handle comprises at least a pointer to the corresponding data section and a reference counter to count the number of references to said data section via said handle.

8. A method as claimed in claim 1 wherein said receiver is a broadcast receiver and the received data comprises DSM-CC (Digital Storage Media-Command and Control) standard modules.

9. A method of cache management in a receiver, for receiving a signal comprising modules having a periodically repeated plurality of data sections, said receiver including cache storage for caching certain modules having data sections included in the signal wherein accessing a data section results in a corresponding reference being created, said references being removed when no longer being accessed, wherein the data sections that are being referenced are noted and then, in any order, said referenced data sections are compacted by relocating them together in one part of the storage means, and the values of the pointers that referred to the moved cells are updated accordingly.

10. A method as claimed in claim 9 wherein each data section has a corresponding handle attributed to it and where all references to a data section are made via said handle.

11. A method as claimed in claim 10 wherein the handle comprises at least a pointer to the corresponding data section and a reference counter to count the number of references to said data section via said handle.

12. A method as claimed in claim 10 wherein the data sections that are being referenced are noted by referring to the reference counter of each handle.

13. A method as claimed in claim 9 wherein said receiver is a broadcast receiver and the received data comprises DSM-CC (Digital Storage Media-Command and Control) standard modules.

14. A receiver apparatus for receiving a signal comprising modules having a periodically repeated plurality of data sections, said receiver including cache storage for caching certain modules with data sections included in the signal wherein accessing a data section results in a corresponding reference being created, said references being removed when no longer being accessed, and wherein if a data section has no references attributed to it, said un-referenced data section is marked for deletion.

15. An apparatus as claimed in claim 14 wherein the receiver has means for keeping a reference count for each data section, said reference count being incremented each time a reference is created and decremented each time a reference is removed, such that a data section with a reference count of zero is marked for deletion.

16. An apparatus as claimed in claim 14 wherein each data section is being received under a corresponding file name, and wherein the received file names are modified within the receiver to distinguish between previous or subsequent versions of the same data sections of the signal that are stored in said storage means.

17. An apparatus as claimed in claim 16 wherein, where there is a later version of a data section stored in the storage means, previous versions of the same data section are immediately deleted, when no longer being referenced.

18. An apparatus as claimed in claim 14 wherein the cache storage means is defragmented by noting the data sections that are being referenced and then, in any order, compacting these referenced data sections by having them relocated in one part of the storage means and having the values of pointers that referred to the moved cells updated.

19. An apparatus as claimed in claim 14 arranged such that said receiver is a broadcast receiver and the received data comprises DSM-CC (Digital Storage Media-Command and Control) standard modules.

20. A receiver apparatus for receiving a signal comprising modules having a periodically repeated plurality of data sections, said receiver including cache storage for caching certain modules with data sections included in the signal wherein accessing a data section results in a corresponding reference being created, said references being removed when no longer being accessed, wherein the data sections that are being referenced are noted and then, in any order, said referenced data sections are compacted by relocating them together in one part of the storage means, and the values of the pointers that referred to the moved cells are updated accordingly.

21. An apparatus as claimed in claim 20 arranged such that each data section has a corresponding handle attributed to it and where all references to a data section are made via said handle.

22. An apparatus as claimed in claim 21 arranged such that the handle comprises at least a pointer to the corresponding data section and a reference counter to count the number of references to said data section via said handle.

23. An apparatus as claimed in claim 20 arranged such that said receiver is a broadcast receiver and the received data comprises DSM-CC (Digital Storage Media-Command and Control) standard modules.

* * * * *